March 17, 1925.
A. H. STOW
1,530,333
WHEELED ROTARY AXLE BOXING FOR MINE AND OTHER CARS
Filed Nov. 22, 1923 4 Sheets-Sheet 1
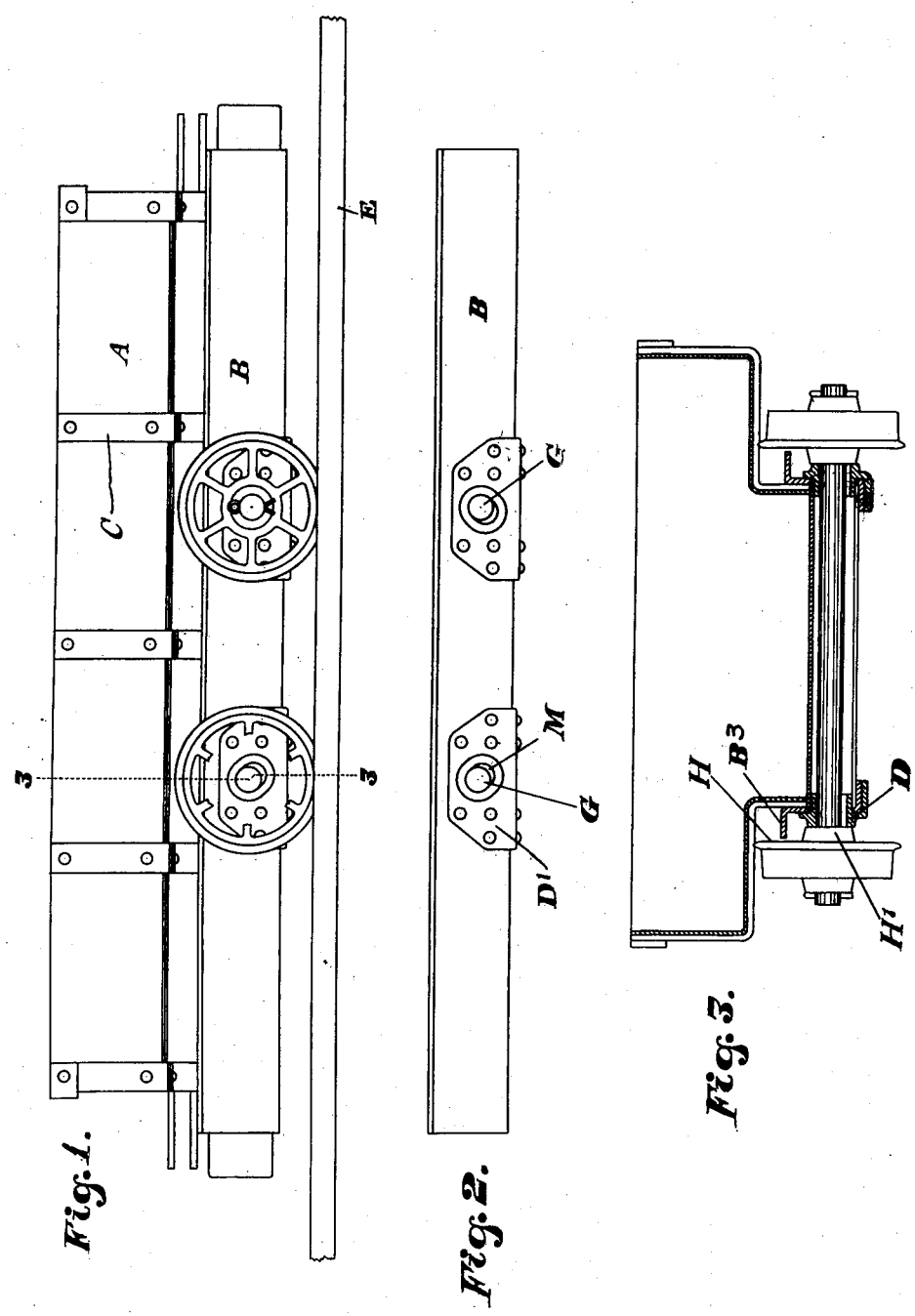
WITNESSES:
INVENTOR

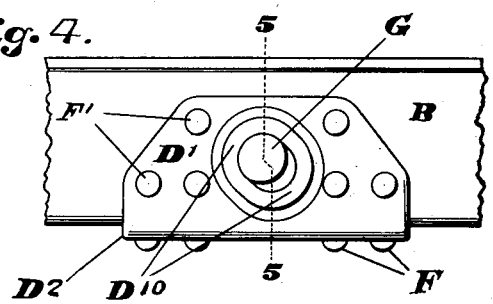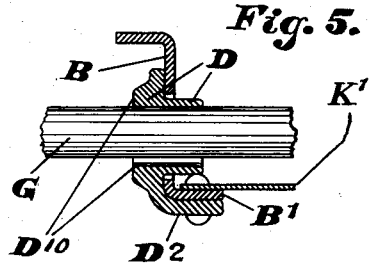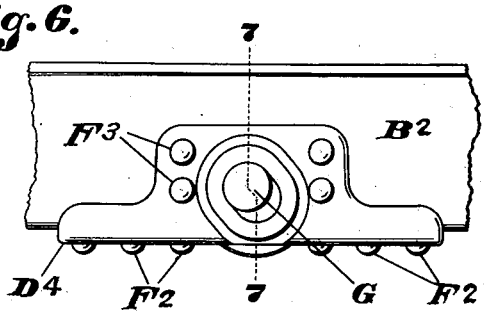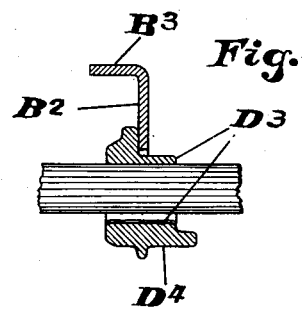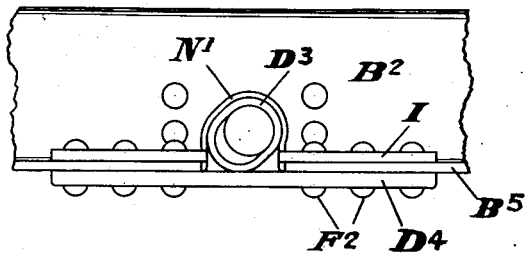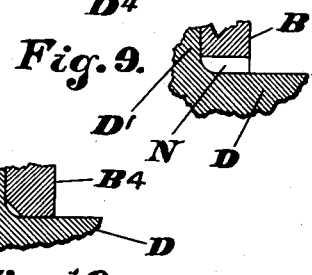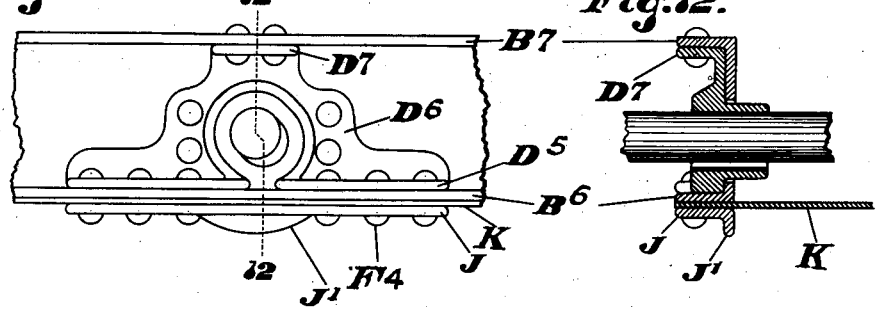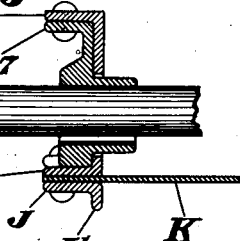

WITNESSES:
E. B. Wilson
H. J. Burtnett

INVENTOR
Hudley Hart Stow

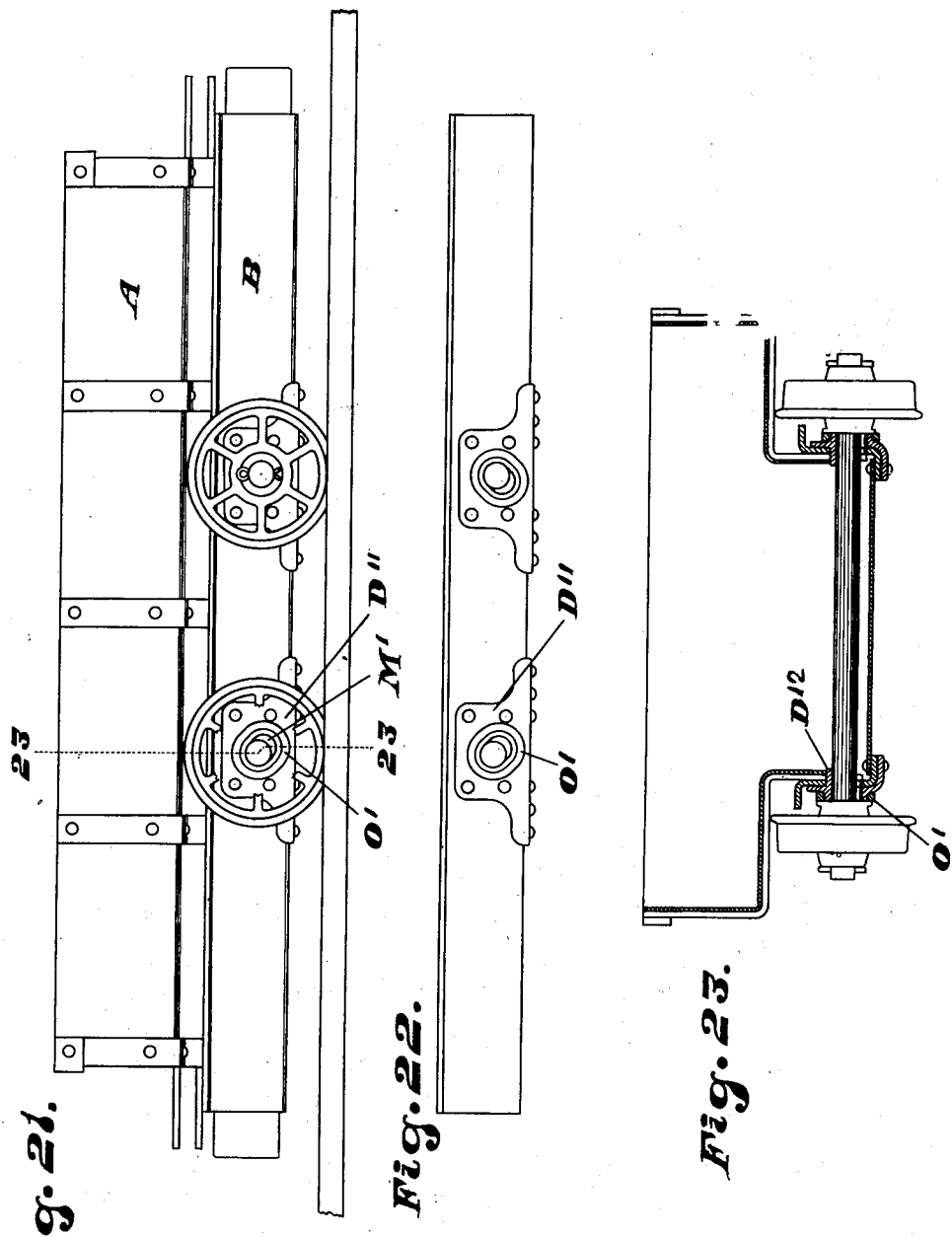

Patented Mar. 17, 1925.

1,530,333

UNITED STATES PATENT OFFICE.

AUDLEY HART STOW, OF CHARLESTON, WEST VIRGINIA.

WHEELED ROTARY AXLE BOXING FOR MINE AND OTHER CARS.

Application filed November 22, 1923. Serial No. 676,326.

*To all whom it may concern:*

Be it known that I, AUDLEY HART STOW, a citizen of the United States of America, and resident of Charleston, county of Kanawha, State of West Virginia, have invented certain new and useful Improvements in and Relating to Wheeled Rotary Axle Boxings for Mine and Other Cars, of which the following is a specification.

This invention relates to certain improvements in and relating to mine cars and the like; and the objects and nature of the invention will be readily understood by those skilled in the art in the light of the following explanation of the accompanying drawings illustrating what I now believe to be the preferred mechanical expressions or embodiments from among other forms, constructions and arrangements within the spirit and scope of the invention.

Mine cars of a certain new type, may be termed side sill supported wing type mine cars, for the reason that the relatively light and flimsy lading holding body, the upper portions of which overhang the wheel truck as viewed from front or rear in order to gain capacity, is supported by a strongly constructed traction truck, the sides of which consist of metal beams which in turn consist of upper and lower horizontal members and vertical connecting members; with rotary wheel axles passing through the vertical connecting members, and thus between the upper and lower horizontal members of the said metal beams which form the longitudinal supporting side sills of the said cars.

The removal of a sufficient amount of the metal of the vertical connecting members of the longitudinal supporting side sills, for the passage of the wheel axles, necessarily somewhat weakens the side sills. An object of the present invention, is to provide a new and improved axle boxing, which while properly designed as an axle boxing, will at the same time reinforce the longitudinal supporting side sills, in an efficient and practical manner, under all the varying conditions of practice; while at the same time, in addition, materially increasing the length of life, of both the car itself, and of the tipple equipment, through the automatic gravity, shock reduction construction of my improved wheel axle boxing.

With these and other objects in view, as hereinafter pointed out, the invention consists in certain novel features in construction and in combinations and arrangements as more fully and particularly set forth and pointed out hereinafter.

Referring to the accompanying drawings:

Fig. 1 is a side view in elevation of a wing type side sill supported mine car, in working position, on section of rail, but with the left wheel hub, as shown, broken away, so as to expose my improved axle boxing, in position.

Fig. 2 is an outside side view in elevation of the supporting side sill removed from the car, but with the boxings attached, and the positions of the wheel axles indicated therein.

Fig. 3 is a transverse vertical section of the car shown in Fig. 1, along the zig-zag dotted line 3—3, Fig. 1.

Fig. 4 is a side elevation, on a larger scale, of the left hand boxing shown in Fig. 2, with the adjacent portion of the side sill.

Fig. 5 is a transverse vertical section along the zig-zag dotted line 5—5, Fig. 4.

Fig. 6 is a view similar to Fig. 4, of a somewhat different form of axle boxing.

Fig. 7 is a transverse vertical section along the zig-zag dotted line 7—7, Fig. 6.

Fig. 8 is an inside view of the reverse side of the construction shown in Fig. 6.

Fig. 9 is a broken view, on a larger scale, of a portion of the construction shown in Fig. 7.

Fig. 10 is a view similar to Fig. 9, of a slightly different form of boxing and side sill.

Fig. 11 is also a view similar to Fig. 4, of a still different form of boxing and side sill.

Fig. 12 is a transverse vertical section along the zig-zag dotted line 12—12, Fig. 11.

Fig. 21 is a side view, similar to Fig. 1, showing the Fig. 15, boxing in position.

Fig. 22 is a view similar to Fig. 2, showing the Fig. 15 boxing, in position.

Fig. 23 is a transverse vertical section along the zig-zag dotted line 23, Fig. 21.

Figure 13:
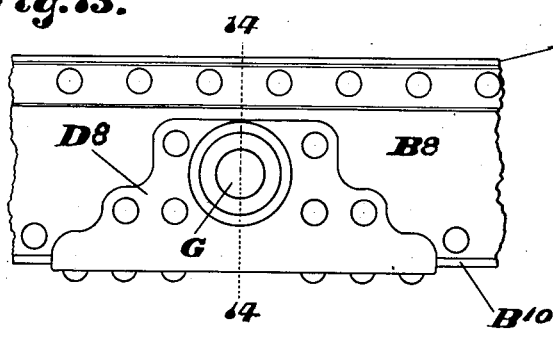
Fig. 13 is a view similar to Fig. 4, showing built up Z-bar side sill, and also showing another form of my improved boxing.

The upper and relatively light and flimsy lading holding body A, Fig. 1, of the car illustrated, is of thin sheet metal, but may be made of wood plank, and is supported and carried by the longitudinal supporting side sills B; the flat strap iron belts or binders C, serving to suitably connect the said lading holding body and sills.

My side sill boxing, may be said to comprise the rotary axle boxing proper D, Fig. 5, and the vertical boxing face or attaching plate or member $D^1$ Fig. 4, the said face plate being integral with the boxing element D.

Owing to the construction of this new type car, the weight of the lading and of the lading holding body is necessarily transmitted to the traction truck which in turn transmits these weights, increased by the weight of the traction truck itself, to the axle boxings, through the action of the longitudinal supporting side sills.

When a mine car becomes derailed, it more usually drops either the height of the rail, say 3″, or else the height of the rail and ties, say 9″, and is then quite likely dragged some distance over the ties, perhaps until the car is finally stopped, by the front wheels hitting some obstruction.

Again, mine cars are emptied of their lading by being moved rapidly up to the dumping position, in order that the maximum number of cars may be dumped or emptied of their lading in a minimum amount of time, and for the same reason the car is then stopped at the dumping position, practically instantly.

The derailment shocks should not occur so frequently in a well regulated mine, but the dumping shock necessarily occurs once for every time a car is unloaded, for the life of the car. Practically all cars are stopped that they may be dumped, by allowing the front wheels only to hit a section of rail curved upward to fit the tread of the wheels.

In this new type car, owing to the position of the axle boxings between the upper and lower horizontal side sill flanges, either the upper or lower flange which happens to be nearest to the boxing, offers an ideal method of engagement with a corresponding flange of the boxing provided for that purpose, and which may evidently be made of amply liberal proportions for the purpose, with reasonable economy of material and workmanship.

What may be said to be the track clearance, at the end of the side sills B, Fig. 1, may be said to be the vertical height of the under side of the side sills, above the top of the rail E. In order to attain the maximum capacity of the car, other items being the same, the track clearance at the point indicated, should be kept as little, as otherwise practical.

With cars of ordinary capacity, more particularly, the position of the axles say midway between the upper and lower flanges, answers well enough, but with cars of greater capacity, the center of the axle will more usually be, a suitable distance below the center of the side sills, which position has therefore been selected, for the purpose of illustration.

Of the rather numerous forms of structural steel side sills, that may be employed for this new type mine car, the Z-bars, of which there are several forms, have somewhat the advantage, under most conditions, the pressed Z-bar having been selected for use in most of the illustrations.

It has been convenient for the purpose of illustration, to make the vertical depth of the side sill $B^2$, Fig. 6, for example, the same as that of the side sill B, Fig. 4. Evidently, however, Fig. 6 may be considered a view of a deeper side sill than that shown in Fig. 4, but drawn to a different scale.

As shown in Figs. 4 and 5, the lower edge of the boxing face plate $D^1$, is extended horizontally inwardly underneath the Z-bar flange $B^1$, which horizontal inward extension $D^2$ may be termed the boxing flange, this extension being such that its upper face bears closely against the under face of the said Z-bar lower flange. As shown, the four bottom rivets F, hold the boxing flange and the Z-bar lower flange, in close contact. The six side rivets $F^1$, similarly hold the boxing face plate in close contact with the Z-bar vertical connecting member B.

With the deeper side sills necessitated by the heavier cars now under consideration, the axles G, Figs. 2, 4, 7, etc., will, as previously explained, be nearer the side sill lower flanges. It therefore follows that it is more economical in material, to get such a connection between the boxing, and the side sill lower flange, as will best serve the purpose desired, instead of with the side sill upper flanges, as explained further on.

For the same track clearance, and the same depth of side sill, decreasing the diameter of the car wheel, to meet difference in mining conditions, will evidently result in the lowering of the axle, with respect to the side sill, as illustrated by Figs. 6 and 7, as compared with Figs. 4 and 5.

The lowering of the axle may evidently be such, that all of the side sill $B^2$, Fig. 7, below the axle bearing proper D³, has been cut away, the lower inner end of the axle bearing proper becoming then merged with or integral with the boxing flange D⁴, see also Fig. 8. In such a case, the said boxing flange D⁴, may be said to be also a part of the compound or built up side sill lower flange, the other component of which is that portion of the side sill lower flange B⁵, which has not been cut away.

Fig. 6 shows a somewhat more effective way of reinforcing the side sills, than that shown in Fig. 4. In Fig. 6, there are also ten rivets, six bottom rivets, F², and four side rivets, F³, while the amount of cast steel in the two boxings, is at least approximately, the same. The boxing bottom flanges D², Figs. 4 and 5, may evidently be considered sill supporting lever arms, as the axle G supports the boxing D¹. The longer boxing flanges D⁴, Figs. 6 and 7, therefore, evidently, will have greater sustaining power, other things being equal.

As shown in Fig. 3, in order to attain maximum lading capacity, the Z-bar side sill may be placed as close to the wheel H, as will permit the upper flange B³ of the Z-bar, to just clear the wheel. The hub H¹ of the wheel may therefore extend somewhat in under the said upper flange, thus fixing the position of the outer vertical face of the boxing bearing proper D, so that the bearing proper, in order to attain a suitable length, may to advantage extend through the side sill, as shown.

In order that the axle bearing D, Fig. 5, may wear evenly, and thus with the least friction, and also with the least cutting action on the axle, the weight of the car and car lading transmitted by the side sill B, should evidently be transmitted, as nearly as otherwise practical, to the approximate center of the said bearing, thus giving, near enough, a balanced bearing, although not necessarily an exactly equally balanced bearing.

Even if the axle G, still Fig. 5, is truly horizontal, and the axle bearing proper D, is exactly at right angles to, and well riveted to the truly perpendicular side sill B, if this side still were at, say the extreme left edge, as shown, of the bearing, the riveting, in due course, would be so strained that the left edge of the bearing would rather quickly cut into the axle, resulting in rapid destruction of same.

Evidently, so long as the bearing is a balanced bearing, near enough, the axle bearing face in the axle boxing, will be automatically maintained parallel to the axle itself, without strain on the boxing rivets, an object of no little importance.

The extension of the axle bearing, through the side sill, necessarily increases the amount of metal removed from the side sill for that purpose, which, however, as already explained, can be readily compensated for, by the requisite additional side sill bracing.

Cast steel can not so well be cast with square corners, so that the corners are more usually somewhat rounded, the resulting curves being sometimes termed fillets, as shown in the several illustrations.

As shown in Fig. 9, the punching of the vertical connecting member B, of the side sill, to admit of the insertion of the axle boxing proper D, will result in a somewhat square edge, which however may be readily removed by reaming off or countersinking say on a 45 degree angle, as shown in Fig. 10, the said square edge of the connecting member B⁴, when the boxing hole in the connecting member may be made of such size as to just neatly receive the axle boxing proper D, clear of the fillet.

Irregularities of track are of more frequent occurrence, in mining, than in railroading, so that vertical wheel play is also highly desirable. This wheel play may be readily accomplished by making the axle boxing bearing an elongated slot. If this elongated axle bearing is on a 45 degree angle or pitch, with the horizontal and rising, in the direction of travel, of the car, as shown in Figs. 2, 4, 6, etc., it will then serve still another useful purpose.

Suppose for example, that the axle G, Fig. 4, has a half inch play, both vertically and horizontally, but on a 45 degree slope, as shown. When the front wheels hit the curved upturned end of the rail termed the horns of the dump, the wheels necessarily come to an instant stop, but the car, if it is moving fast enough, before it will come to a dead stop, will force the boxing bearing D, Fig. 5, see also Fig. 4, to slide up on the axle, along the 45 degree slope of the elongated axle bearing or slot, until the car, at the forward axle, has been raised the ½″, as above, thus attaining my automatic or gravity shock absorber action, but again without the use of either springs or moving parts, as well as without additional cost. This greatly reduces both the derailment and dumping shocks, so far as the car is concerned, and in the case of the dumping shock, also reduces the shock of the tipple structure itself, which is no small advantage, with the heavier cars now under consideration.

Two flat shear bars I, may be placed over the side sill lower flange B⁵, their inner ends bearing against the lower vertical part of the axle boxing bearing proper, just about where same merges into the boxing flange, as shown; the flange rivets F², passing through the boxing flange D⁴, the sill flange B⁵, and the said shear bars.

Figures 11 and 12, illustrate more particularly the use of ship channels for side sills, with the adaptation of my improved boxing to same. In this case, it will be evident, the boxing flange $D^5$ must with the ship channel be above the sill flange $B^6$, the boxing face $D^6$, being extended upwardly, as shown, until it meets and bears against the underside of the upper ship channel flange $B^7$, and there turned outwardly, to form the boxing upper flange $D^7$, where it is riveted in place.

With the ship channel side sill shown in Fig. 11, the horizontal reinforcing strip J, below the car bottom K, is also of cast steel, and having a downwardly projecting or vertical flange $J^1$, the lower part of which is an arc of circle, in the center of the strip, as shown; the reinforcing strip and the car bottom being riveted to the under side of the sill bottom flange $B^6$.

With the pressed steel Z-bar side sill B, Fig. 4, the car bottom $K^1$, may be conveniently riveted to the top of the side sill bottom flange $B^1$, Fig. 5.

Figure 14:
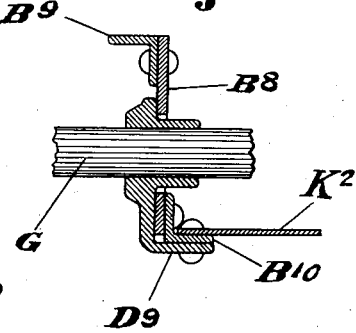
Fig. 14 is a view similar to Fig. 5, along the dotted line 14—14, Fig. 13, also showing built up Z-bar side sill.

My improved style of boxing, however, possesses substantial advantages, even if the axle bearing is not elongated, as shown in Figs. 13 and 14, which figures also illustrate its application to a built-up Z-bar side sill which replaces the pressed steel Z-bar side sill B, of Figs. 4 and 5.

The web plate $B^8$, evidently forms the vertical connecting member of the side sill, to the upper edge of which is riveted the angle, the upper horizontal leg $B^9$, of which forms the upper horizontal member of the side sill, a corresponding angle being riveted to the bottom part of the web plate, but on the opposite side, the lower horizontal leg $B^{10}$, of which angle, forms the lower horizontal member of the supporting side sill. The lower edge of the boxing face plate $D^8$, as before, is extended inwardly so as to form the boxing horizontal flange $D^9$, the upper face of which bears neatly against the under side of the lower horizontal member $B^{10}$, of the side sill; the boxing face plate and flange as well as the built up Z-bar itself, being suitably riveted together, as shown. The car bottom $K^2$ may be conveniently riveted to the top of the lower horizontal leg $B^{10}$, of the said lower angle.

My improved boxing may evidently be applied to any of the forms of flanged metal beams, whether pressed, rolled, built up or composite, in whole or in part, as side sills.

In order to prevent the outside face of the boxing proper D, Fig. 5, from being too rapidly cut away by the inner adjacent face of the wheel hub H, all the boxings may have a broad outer vertical bearing face $D^{10}$, Fig. 5.

As will be noticed in Fig. 2, the right and left boxings have their axle bearing slots sloped in opposite directions, partly because with the side wise dumping car shown, either end of the car may first reach the dump, so that the gravity shock absorber action will result whichever way the car may be dumped. Then too, with this arrangement, not, however, essential, the derailment shock absorber action will take place in so far as the front wheels are concerned, whether the car is being hauled either in or out of the mines, the cars not being usually turned around for this purpose; it therefore follows, whichever way the axle bearing slots are turned, the gravity shock absorber action will take place some time or other, under some conditions.

From Figs. 21 and 22, for instance, it will be evident, that the left boxing $D^{11}$, as shown, for the near side sill B, will serve for the right boxing, for the far side sill, thus only requiring two boxing patterns, instead of four, and may thus be termed reversible boxings.

This invention, however, admits of further variation, still entirely within its scope, along several lines.

The fundamental object of the mine car rotary axle bearing, in the actual practice of today, is merely to permit the axle to turn around, frequently enough, so that the portion of the axle within the wheel, will continue to wear round. There is therefore, not at all the same reason, for making the length of the axle bearings, at the bottom, as long as at the top. As this boxing cannot so safely be made out of cast iron, the cast steel, if such is used, will be amply safe, both to itself, and to the axle, for a much shorter length of bearing, at the bottom, than at the top, where it is so nearly under constant strain, and where all the wear, near enough, will come from such turnings of the axle, as may occur, from time to time.

This shortening of the width of the axle bearing, at the bottom of the elongated slot, will save a little of the cast steel, in the boxing, which is expensive enough. The further advantage, however, which is one of considerable and fundamental importance, is that by this means the amount of metal necessarily removed from the side sill, may be materially reduced.

Figure 15:
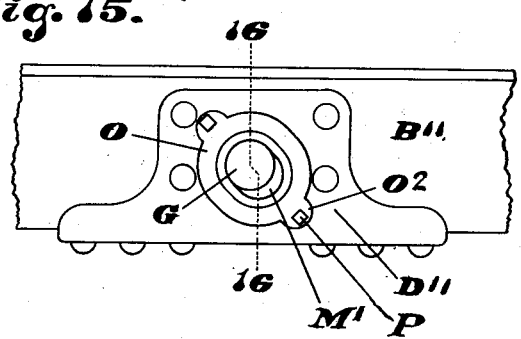
Fig. 15 is a side view, similar to Fig. 4, of a still different form of boxing.

The axle G, Fig. 15, is placed at the same distance above the bottom of the side sill $B^{11}$, as the axle in Fig. 4, for the purpose of comparison; the general design, however, of the outside face $D^{11}$, of the Fig. 15, boxing, being evidently similar to that of the Fig. 6 boxing. The more essential difference however, between the Fig. 15 boxing, and those previously described, is shown by Figs. 16 and 17.

Figure 16:
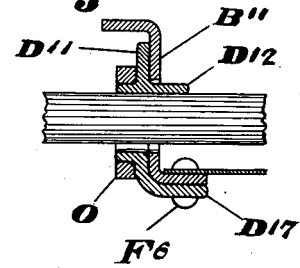
Fig. 16 is a cross section along the zig-zag dotted line 16—16, Fig. 15.
Figure 17:
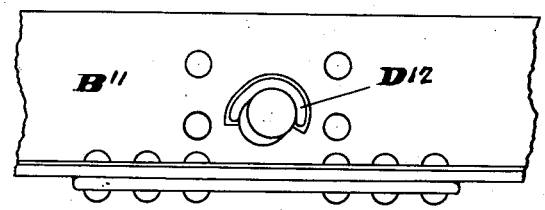
Fig. 17 is a view similar to Fig. 8, of the boxing shown in Fig. 15.

As shown in Fig. 17, the portion of the axle bearing proper $D^{12}$, which extends through the vertical web $B^{11}$, of the Z-bar side sill, see also Fig. 16, is only approximately the upper half, of the similar inward extension D³, of the axle bearing, as shown in Fig. 8. The saving in cast steel, as well as the reduction in the amount of metal, necessarily removed from the vertical member of the side sill, will be evident from a comparison of Figs. 5 and 16, see also Fig. 17.

Figure 18:
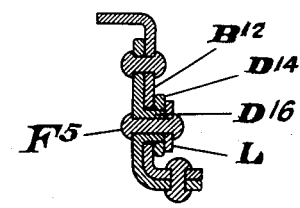
Fig. 18 is a section along the dotted line 18—18, Fig. 19.
Figure 19:
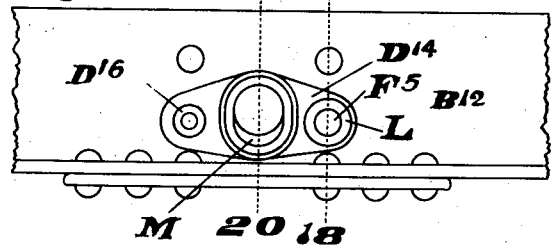
Fig. 19 is a view similar to Fig. 8, of a still different form of boxing.
Figure 20:
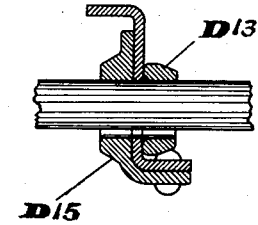
Fig. 20 is a section along the dotted line 20—20, Fig. 19.

The amount of metal removed from the vertical web of the side sill, can be further reduced by the form of boxing shown in Figs. 18, 19 and 20, which however, requires the addition of a secondary inside boxing D¹³, Fig. 20, the latter having the vertical attaching face plate D¹⁴, Fig. 19. The main or outside boxing, D¹⁵, Fig. 20, has two hollow lateral inwardly extending bosses D¹⁶, Fig. 18, extending through both the vertical web B¹², of the side sill, and also through the inner boxing face plate. Over the end of these bosses, are placed washers L, Fig. 19, which overlap the face plate D¹⁴, the boxing rivets F⁵, holding the several parts in working position. What would be the left washer and rivet, as shown, have been omitted, in order to expose the inner face of the left outside boxing boss D¹⁶. Evidently, the outside boxing bosses will take care of any shocks or strains, due to the weight of the car or otherwise, to which the inside boxing may be subjected from time to time. This is evidently my improved boxing, made in two parts, suitably united.

It is, however, important to note, that my improved boxing may also be made, with elongated axle bearings on slopes or pitches other than gravity shock absorbing slopes, and which also may be made vertical, as the vertical slot M, Fig. 19. Such boxings will have all the other advantages heretofore described, except of course, the shock absorbing function. With merely the vertical elongated axle bearing the wheels will still remain in contact with the rail on uneven track, thus saving many wrecks.

It is also to be noted, that my improved boxing may be made without any axle play whatever, as in Fig. 13, in which the axle G, has no play, as in the present form of boxing now in general use.

There are also many other forms of industrial service, as in the case of quarry cars, in which my improved boxing may be applied. The boxing may be said to carry, not only the side sills, but the entire weight of the car and of its lading, where there is any. As will be evident, from Fig. 16, for example, the boxing D¹¹, has been so designed that it will carry the side sill B¹¹, so long as the load is a quiescent load, without any appreciable assistance, from the boxing rivets F⁶, due mainly to the position of the boxing flange D¹⁷. The boxing therefore, as well as the bearing, may be termed near enough equally balanced, while the horizontal boxing flange may be termed a sill supporting bottom flange. Even if all the boxing rivets became seriously loosened, the extension of the axle bearing through the vertical member of the side sill, will evidently retain the boxing near enough in working position, until new rivets can be inserted, which advantage would also apply to the boxing bosses D⁶, Figs. 18 and 19.

In Fig. 9 may be seen the small space N, due to the boxing bearing fillet previously described, that between the vertical member of the side sill B, and the axle bearing proper D. See also the similar space N¹, Fig. 8.

As even the harder grades of cast steel are relatively soft, for this purpose, the broad wheel boxing bearing face D¹⁰, Fig. 5, may evidently be replaced by a special hardened wrought steel washer O, Figs. 15 and 16, which evidently, cannot come off, see Fig. 23, unless the wheel does, although it may be retained in working position, by any suitable means, for this purpose, as for instance, by the bolt P. The hardened washers, O¹, Figs. 21, 22 and 23, are shown without the attaching extensions O², Fig. 15. Where the axle bearing is elongated, evidently, the washer cannot turn around, as the wheel does, which would wear away the adjacent cast steel.

What I claim, is:—

1. In combination, a longitudinal supporting flanged metal side sill, and a wheeled rotary axle boxing consisting of an integral structure including a balanced axle bearing contained within the side sill, a vertical attaching face also acting as a side sill reinforcing element, and a bottom flange which serves the double purpose of supporting the side sill and that of reinforcing the side sill.

2. In combination, a longitudinal supporting flanged metal side sill, and a wheeled rotary axle boxing consisting of an integral structure including a balanced axle bearing contained within the side sill and elongated at right angles to the axle on a gravity shock absorbing slope, a vertical attaching face also acting as a side sill reinforcing element, and a bottom flange which serves the double purpose of supporting the side sill and also that of reinforcing the side sill.

3. In combination, a longitudinal supporting flanged metal side sill, and a wheeled rotary axle boxing consisting of an integral structure including a balanced axle bearing contained within the side sill and having a wheel bearing face, a vertical attaching face also acting as a side sill reinforcing element, and a bottom flange which serves the double purpose of supporting the side sill and also that of reinforcing the said side sill.

4. In combination, a longitudinal supporting flanged metal side sill, and a wheeled rotary axle boxing consisting of an integral structure including a balanced axle bearing contained within the side sill and elongated at right angles to the axle, a vertical attaching face also acting as a side sill reinforcing element, and a bottom flange which serves the double purpose of supporting the side sill and reinforcing the side sill.

5. In combination, a longitudinal metal Z-bar supporting side sill, and a wheeled rotary axle boxing consisting of an integral structure including a balanced axle bearing contained within the side sill, a vertical attaching face also acting as a side sill reinforcing element, and a bottom flange which serves the double purpose of supporting the side sill and reinforcing the side sill.

6. In combination, a longitudinal supporting flanged metal side sill, and a rotary wheeled axle boxing consisting of an integral structure including an axle bearing contained within the side sill, a vertical attaching face intermediate the ends of the bearing and also acting as a side sill reinforcing element, and a bottom flange which serves the double purpose of supporting the side sill and reinforcing the side sill.

7. In combination, a longitudinal supporting flanged metal side sill, and a wheeled rotary axle boxing consisting of an integral structure including a balanced axle bearing contained within the side sill, a vertical attaching face also acting as a side sill reinforcing element, and a bottom flange which serves the double purpose of supporting the side sill and of reinforcing the said side sill.

8. In combination, a longitudinal supporting flanged metal side sill, and a wheeled rotary axle boxing consisting of an integral structure including an axle bearing contained within the side sill and elongated at right angles to the axle, a vertical attaching face intermediate the ends of the bearing and acting also as a side sill reinforcing element, and a bottom flange which serves the double purpose of supporting the side sill and of reinforcing the side sill.

9. In combination, a longitudinal supporting flanged metal side sill, and a wheeled rotary axle boxing consisting of an integral structure including an axle bearing contained within the side sill and elongated at right angles to the axle on a gravity shock absorbing slope, a vertical attaching face intermediate the ends of the bearing and also acting as a side sill reinforcing element, and a bottom flange which serves the double purpose of supporting the side sill and that of reinforcing the side sill.

10. In combination, a longitudinal supporting flanged metal side sill, and a wheeled rotary axle boxing consisting of an integral structure including a top balanced axle bearing contained within the side sill, and a vertical attaching face intermediate the ends of the bearing and acting as a side sill reinforcing element, and a bottom flange which serves the double purpose of supporting the side sill and that of reinforcing the side sill.

11. In combination, a longitudinal supporting flanged metal side sill, and a wheeled rotary axle boxing consisting of an integral structure including a top balanced axle bearing elongated at right angles to the axle and contained within the side sill, a vertical attaching face intermediate the ends of the bearing and also acting as a side sill reinforcing element, and a bottom flange which serves the double purpose of supporting the side sill and that of reinforcing the side sill.

12. In combination, a longitudinal supporting flanged metal side sill, a rotary wheeled axle, and a wheeled rotary axle boxing consisting of an integral structure including an axle bearing extending through the said side sill, a vertical attaching face also acting as a side sill reinforcing element, and a bottom flange which serves the double purpose of supporting the side sill and also that of reinforcing the side sill.

13. In combination, a longitudinal supporting flanged metal side sill, and a wheeled rotary axle boxing consisting of an integral structure including an axle bearing the top portion of which extends through the side sill, a vertical attaching face which also acts as a side sill reinforcing element, and a bottom flange which serves the double purpose of supporting the side sill and also that of reinforcing the said side sill.

14. In combination, a longitudinal supporting flanged metal side sill, and a wheeled rotary axle boxing consisting of an integral structure including a top balanced axle bearing elongated at right angles to the axle on a gravity shock absorbing slope, a vertical attaching face also acting as a side sill reinforcing element, and a bottom flange which serves the double purpose of supporting the side sill and also that of reniforcing the said side sill.

15. In combination, longitudinal supporting flanged metal side sills, and reversible wheeled rotary axle boxings consisting of integral structures including balanced axle bearings contained within the side sills and elongated at right angles to the axles on a gravity shock absorbing slope, vertical attaching faces also acting as side sill reinforcing elements, and bottom flanges which serve the double purposes of supporting the side sills and also that of reinforcing the said side sills.

16. In combination, a longitudinal supporting flanged metal side sill, an elongated wheel bearing washer, and a wheeled rotary axle boxing consisting of an integral structure including a balanced axle bearing contained within the side sill and elongated at right angles to the axle on a gravity shock absorbing slope, a vertical attaching face also acting as a side sill reinforcing element, and a bottom flange which serves the double purpose of supporting the side sill and also that of reinforcing the side sill.

17. In combination, a longitudinal supporting flanged metal side sill, an elongated wheel bearing washer, and a wheeled rotary axle boxing consisting of an integral structure including a balanced axle bearing contained within the side sill and elongated at right angles to the axle, a vertical attaching face also acting as a side sill reinforcing element, and a bottom flange which serves the double purpose of supporting the side sill and also that of reinforcing the side sill.

AUDLEY HART STOW.